Oct. 25, 1938.  A. S. NORCROSS  2,134,414
VISOR AND LIGHT SCREEN FOR VEHICLES
Filed Sept. 21, 1937  2 Sheets-Sheet 1
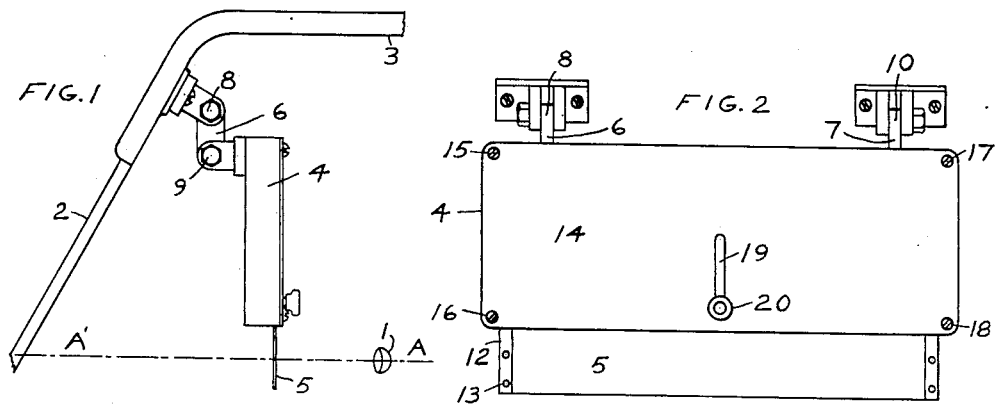
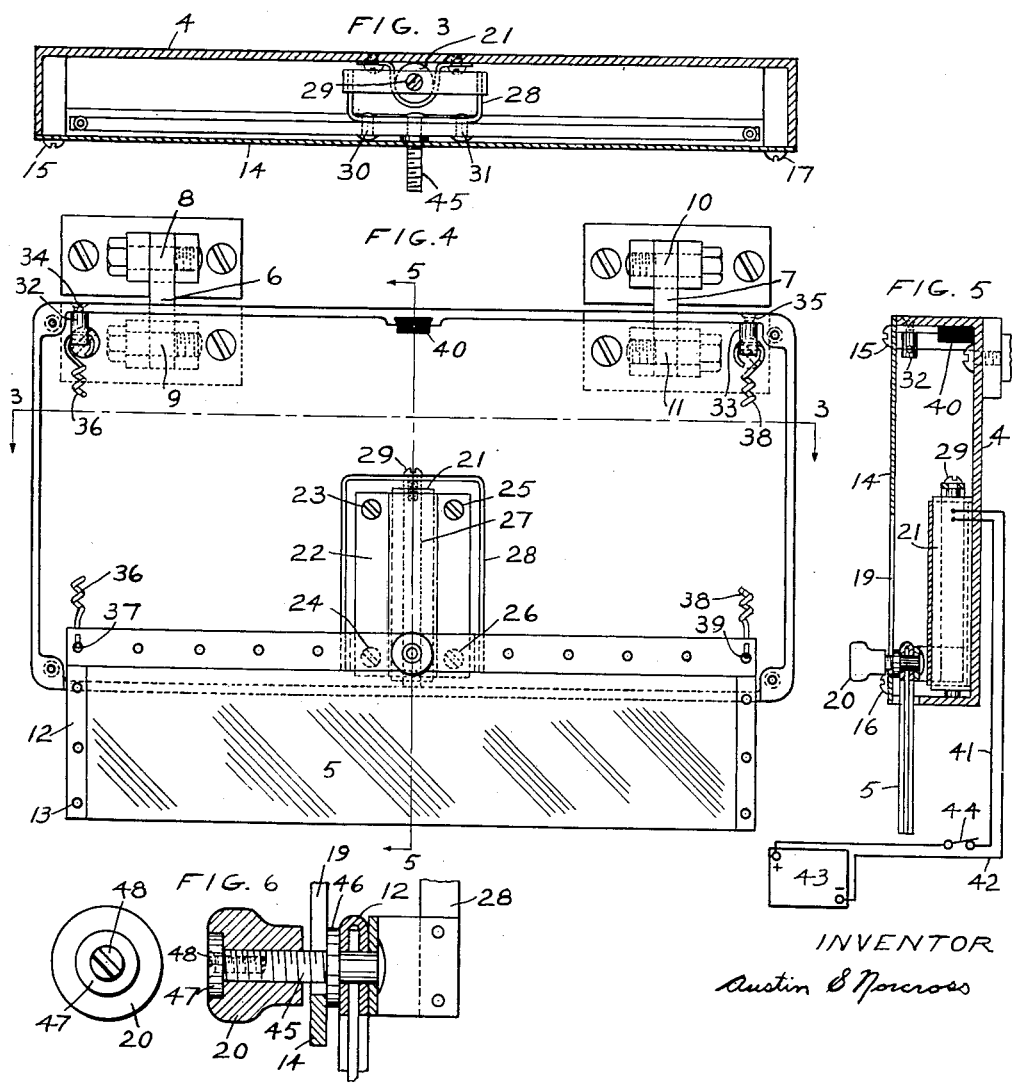
INVENTOR
Austin S Norcross Oct. 25, 1938.    A. S. NORCROSS    2,134,414
VISOR AND LIGHT SCREEN FOR VEHICLES
Filed Sept. 21, 1937    2 Sheets-Sheet 2
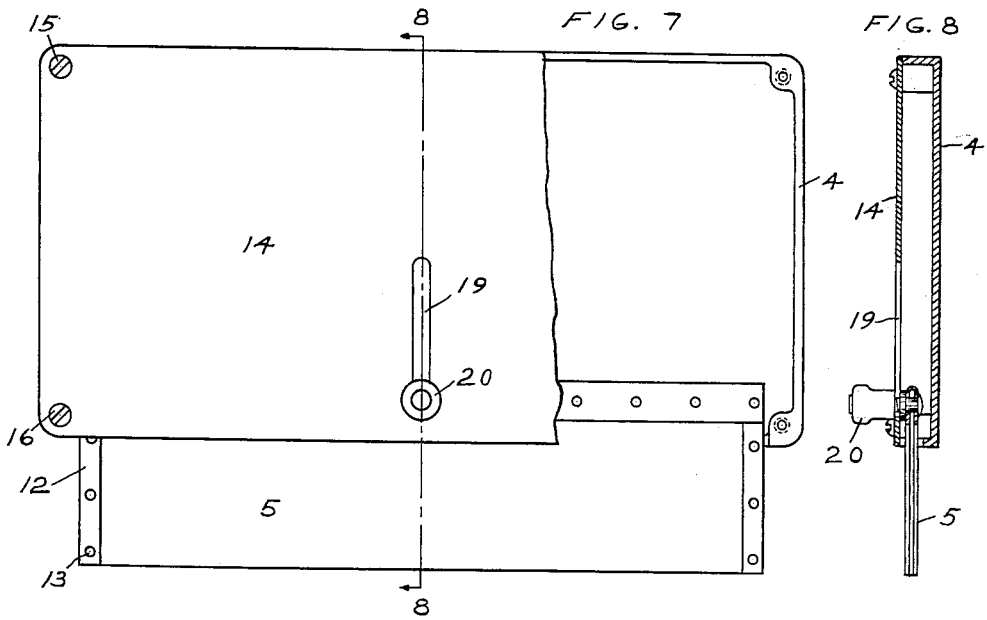
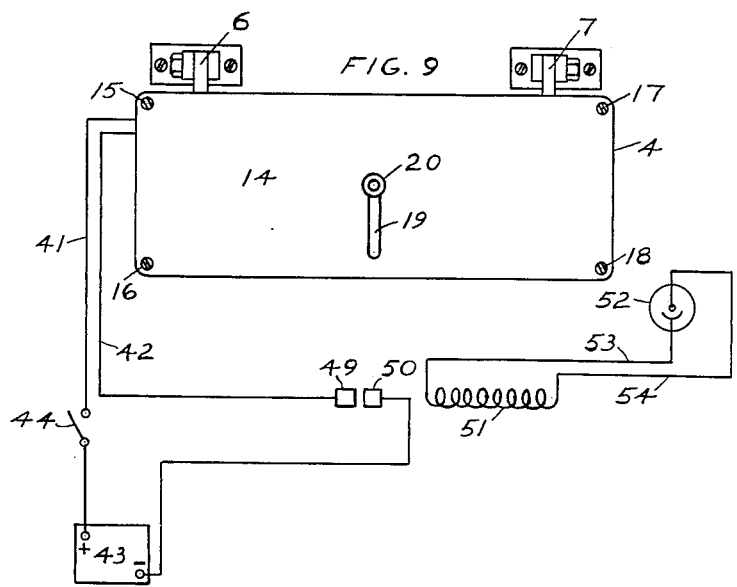
INVENTOR
Austin S. Norcross Patented Oct. 25, 1938

2,134,414

UNITED STATES PATENT OFFICE 2,134,414

VISOR AND LIGHT SCREEN FOR VEHICLES

Austin S. Norcross, Newton, Mass.

Application September 21, 1937, Serial No. 164,892

10 Claims. (Cl. 296—97)

This invention relates to a new combination of a visor and a light screen for motor vehicles.

It is common practice to attempt to direct the light from automobile headlights to prevent glare to the occupants of an approaching vehicle. However, under ordinary driving conditions excessive glare is often experienced and various shields have been developed to weaken the intensity of light from such sources. Unfortunately these shields decrease the visibility of the road and other objects so much that the advantage of using such a shield in a fixed position for night driving is questionable. In general, shields aid the visibility when the light from approaching headlights is present but reduces the visibility when such light sources are not present.

Several other methods have been proposed as a solution to the automobile lighting problem. Among the more important of these are polarized light, controlled light frequency, and controlled interrupted light.

Polarized light in order to be effective requires the use of a light analyzer, often referred to as a viewing screen. The use of light of different frequency for vehicles passing in opposite directions also necessitates the employment of a filter or viewing screen to obstruct light of the particular frequency of the approaching vehicles. Likewise controlled intermittent light requires a synchronous shutter or viewing screen timed to obstruct the light from approaching vehicles.

These few facts are briefly mentioned in order that the objects of this invention may be better understood. It is important to note that with all the methods that have been suggested for automobile headlighting, there are available shields or screens which increase the visibility when the light of an approaching headlight is present, but such devices decrease the road visibility when the light from approaching vehicles is not present. Consequently the use of any shield or screen is advantageous only when an undesirable opposing light is present. At all other times the road visibility is better without a shield or screen of any type.

The term, "light screen", or "screen" as used is to be understood to include all the above mentioned shields, screens, analyzers, filters, shutters and the like.

One object of this invention is to provide a light screen which may be moved into a particular line of vision when desired and which may be returned and retained in a concealed and protected position within a visor when it is not in use.

A further object is to provide a simple inexpensive means for controlling the position of the screen by remote control from any desired position with a minimum of interference to the vehicle operator.

Another object is to provide a means for efficiently utilizing a small light screen made of comparatively expensive material.

Still another object is to provide means for automatically operating the screen.

For a better understanding of the principles involved in my invention, I refer to the following description of illustrative embodiments thereof, as shown by way of example in the accompanying drawings:

Fig. 1 is a side elevation view of an automobile showing the general arrangement of the visor and light screen of this invention.

Fig. 2 is a front elevation view of the device shown in Fig. 1.

Fig. 3 is a sectional view taken along the plane 3—3 of Fig. 4.

Fig. 4 is a view of the visor with the cover removed.

Fig. 5 is a sectional view taken along the plane 5—5 of Fig. 4 showing the arrangement for moving the screen by remote control.

Fig. 6 is an enlarged view of the mechanism for manually moving and clamping the screen in any desired position.

Fig. 7 is a front cut away view of the combination for manual control.

Fig. 8 is a sectional view taken along the plane 8—8 of Fig. 7.

Fig. 9 is a diagrammatic illustration of the circuit employed for automatically controlling the position of the screen.

Referring to Figs. 1 and 2 which show the general arrangement of the invention, the eye of the person using the invention is shown at 1 with A A' as the desired line of vision. The housing 4 functions as a visor and is supported from the vehicle by brackets 6 and 7. The bracket 6 is adjustable at 8 and 9 and similarly the bracket 7 is adjustable at 10 and 11. The adjustable point 11 is not seen in Figs. 1 and 2 but is shown in Fig. 4 where the cover of the housing is removed. The windshield is indicated by 2 and the top by 3. The screen 5 is attached to a metal rim 12 on the sides and top by small rivets such as shown at 13. The screen may be concealed within the visor or lowered into a desired line of vision. The housing cover 14 is held in place by the four screws 15, 16, 17 and 18. The vertical slot 19 in the cover and the clamping nut 20 used to manually control the position of the screen will be explained later.

In using this visor and screen combination the visor is first adjusted so that when the screen is lowered from the housing it will be in the line of vision between the operator's eyes and the source of objectionable light. The screen may then be raised to its concealed position within the visor when the objectionable light is not present permitting an unobstructed vision. Furthermore the visor itself by means of the adjustable brackets may be folded up out of the way when desired the same as other visors which do not contain therein the slidable screen.

An important feature of this arrangement is that a small screen may be effectively utilized which is particularly desirable if expensive material is used for the screen. In addition the screen is protected from mechanical damage, and is concealed when not in use so that it does not in any way detract from the appearance of the vehicle.

I preferably employ the embodiments illustrated in Figs. 3, 4 and 5 to control the position of the screen from some convenient remote location. A solenoid 21 is fastened to the housing by means of bracket 22 which is held by screws 23, 24, 25 and 26. The plunger 27 which operates within the solenoid is attached to a metal frame 28 by screw 29. The frame 28 is also fastened to the metal rim 12 by rivets 30 and 31. The spring supports 32 and 33 are fastened to the housing by screws 34 and 35 respectively. Spring 36 is connected between support 32 and hole 37 in the rim and similarly spring 38 is connected between support 33 and hole 39. These springs, shown broken in Fig. 4 and omitted in Fig. 5 are used in tension to return and hold the screen in its normally concealed position within the visor when its use is not desired. The screw 29 strikes the rubber bumper 40 when the screen is returned to its concealed position. The leads 41 and 42 from the solenoid are connected to battery 43 through a suitable switch 44. When the switch is closed the solenoid draws the plunger into the coil thereby moving the screen down into its operable position against the tension of the springs. The springs return the screen into the housing as soon as the switch is opened. The switch may be located wherever it is most convenient and it is important to note that the screen may be moved very quickly and consequently does not interfere with the vision of the driver or the proper operation of the vehicle.

Fig. 6 shows the details of the clamping nut which is used to manually adjust and clamp the screen as desired. The right end of pin 45 has been headed over to hold the rim 12 and the frame 28 firmly against the shoulder 46 of the pin. The pin is threaded to the left of the shoulder and passes through the slot 19 in the housing cover. The clamping nut is threaded onto the pin with washer 47 and screw 48 added to prevent the nut from being removed.

To manually operate the visor, the clamping nut is turned in a counter clockwise direction and raised or lowered until the screen is in the desired position. The nut may then be turned clockwise until the cover 14 is clamped between the nut 20 and the shoulder 46 which prevents the screen from moving. The clamping nut should be in its extreme counter-clockwise or unclamped position when the screen is to be operated by remote control.

If only manual control is desired the preferred embodiments are shown with the brackets omitted in Figs. 7 and 8. The thickness of the housing in this case may be reduced because the visor and screen combination is then similar to Figs. 3, 4 and 5 except that parts 21-44 inclusive are omitted.

To automatically lower the screen upon the presence of an objectionable opposing light I preferably employ the circuit shown in Fig. 9. The arrangement is identical with those shown in Figs. 3, 4 and 5 except that the contacts 49 and 50 of relay 51 are introduced into lead 42 and a light sensitive cell 52 is connected in series with the relay by leads 53 and 54. The light sensitive cell is placed to receive the opposing objectionable light to be screened. When the switch 44 is closed to make the device operable, the presence of an objectionable opposing light will produce sufficient current in the relay to close its contacts and energize the solenoid to lower the screen. Upon removal of the objectionable opposing light the current in the relay decreases allowing the contacts to open which deenergizes the solenoid and permits the screen to return to its concealed position. The device is therefore automatically operated to raise or lower the screen according to the light requirements and is made inoperable by opening switch 44.

Instead of enclosing the screen within a visor, I may movably mount it on the vistor body so that when the visor is adjusted to its operative position, the screen may be moved to an operative position below the visor in the line of vision of the operator or returned to a position adjacent to the visor. To conceal and protect the screen when it is not in an operative position a suitable housing may be employed which for a remote control combination may enclose the solenoid with its associated members.

If preferred the screen and solenoid with its associated members may be movably mounted entirely within a separate housing which may then be attached to a visor.

In such combinations the visor and housing together function as a visor and the operation of the screen is the same as previously described. It is therefore intended that whenever the term "hollow visor" is used hereafter it is to be interpreted to include all such combinations as well as the arrangements shown and described in this specification.

The movable screen may be operated either manually at the visor or from some remote position. It is evident that there are various other methods for manually moving and clamping the screen. Likewise the screen may be moved from some remote position by other methods such as a system of levers or some other mechanical mechanism.

The most desirable position for the remote control will be largely dependent upon the individual. For example, it is possible to use a switch or button located either on the floor of the vehicle to be operated by foot or on the steering wheel or steering column where it may be operated conveniently by hand.

The methods of this invention differ from the previously proposed methods for moving light screens in that by combining the light screen with a visor as described the screen is concealed and protected when not in use and does not in any way impair the vision or detract from the appearance of the vehicle when the screen is inoperative. The visor may be adjusted by this combination so that a small screen may be used which may be operated by remote or automatic control very quickly without even momentarily obstructing the vision or otherwise interfering with the proper operation of the vehicle. Furthermore the fact that a small screen may be used is particularly important if expensive material is employed for the screen. The combination is simple and inexpensive to build for manual, remote, or automatic control and is easily installed on any motor vehicle.

I am aware that this invention may be embodied in other specific forms and desire the present embodiments to be considered in all respects as illustrative and not restrictive; reference being had to the accompanying claims rather than the foregoing description to indicate the scope of the invention.

What I claim is:

1. In combination, a hollow visor, means to pivotably mount said visor on a vehicle in the rear of the windshield, adjustable to vary the height of said visor when pivoted to operative position, a screen slidably mounted and normally concealed within said visor, a solenoid mounted within said visor to slide said screen into a particular line of vision, means to energize said solenoid, and means for returning and holding said screen in the concealed position when said solenoid is not energized.

2. In combination, a hollow visor, means to pivotably mount said visor on a vehicle in the rear of the windshield, adjustable to vary the height of said visor when pivoted to operative position, a screen slidably mounted and normally concealed within said visor, a solenoid mounted within said visor to slide said screen into a particular line of vision, means to energize said solenoid, means for returning and holding said screen in the concealed position when said solenoid is not energized, and means for manually moving and clamping said screen in any desired position.

3. In combination, a hollow visor, means to mount said visor on a vehicle in the rear of the windshield, a screen movably mounted and normally concealed within said visor, electrically actuated means to move said screen into a particular line of vision, and means for returning and holding said screen in a concealed position when the use of said screen is not desired.

4. In combination, a hollow visor, means to mount said visor on a vehicle in the rear of the windshield, a screen movably mounted and normally concealed within said visor, electrically actuated means to move said screen into a particular line of vision, means for returning and holding said screen in the concealed position when the use of said screen is not desired, and means for manually moving and clamping said screen in any desired position.

5. In combination, a hollow visor, means to mount said visor on a vehicle in the rear of the windshield, a screen movably mounted and normally concealed within said visor, means operable from a position remote from said visor to move said screen into a particular line of vision, and means for returning and holding said screen in the concealed position when the use of said screen is not desired.

6. In combination, a hollow visor, means to mount said visor on a vehicle in the rear of the windshield, adjustable to vary the height of said visor when pivoted to operative position, a screen movably mounted and normally concealed within said visor, means operable from a position remote from said visor to move said screen into a particular line of vision, means for returning and holding said screen in the concealed position when the use of said screen is not desired, and means for manually moving and clamping said screen in any desired position.

7. In combination, a hollow visor, means to pivotably mount said visor on a vehicle in the rear of the windshield, adjustable to vary the height of said visor when pivoted to operative position, a screen movably mounted and normally concealed within said visor, a solenoid mounted within said visor to move said screen into a particular line of vision, light sensitive means actuated upon the presence of an objectionable opposing light to energize said solenoid, and means for returning and holding said screen in the concealed position when the said objectionable light is not present.

8. In combination, a hollow visor, means to pivotably mount said visor on a vehicle in the rear of the windshield, adjustable to vary the height of said visor when pivoted to operative position, a screen movably mounted and normally concealed within said visor, a solenoid mounted within said visor to move said screen into a particular line of vision, light sensitive means actuated upon the presence of an objectionable opposing light to energize said solenoid, means for returning and holding said screen in the concealed position when said objectionable light is not present, and means for manually moving and clamping said screen in any desired position.

9. In combination, a hollow visor, means to mount said visor on a vehicle in the rear of the windshield, a screen movably mounted and normally concealed within said visor, electrically actuated means to move said screen into a particular line of vision, light sensitive means actuated upon the presence of an objectionable opposing light to actuate said electrical means, and means for returning and holding said screen in the concealed position when said objectionable light is not present.

10. In combination, a hollow visor, means to mount said visor on a vehicle in the rear of the windshield, a screen movably mounted and normally concealed within said visor, electrically actuated means to move said screen into a particular line of vision, light sensitive means actuated upon the presence of an objectionable opposing light to actuate said electrical means, means for returning and holding said screen in the concealed position when said objectionable light is not present, and means for manually moving and clamping said screen in any desired position.

AUSTIN S. NORCROSS.